US008659790B2

(12) United States Patent
Tsuzuki

(10) Patent No.: US 8,659,790 B2
(45) Date of Patent: Feb. 25, 2014

(54) IMAGE READING APPARATUS AND IMAGE FORMING APPARATUS THAT DETERMINES SCANNING RESOLUTION BASED ON CONTINUOUS, SAME-KIND PIXELS

(75) Inventor: Hiroyuki Tsuzuki, Fukushima (JP)

(73) Assignee: Oki Data Corporation, Tokyo (JP)

( * ) Notice: Subject to any disclaimer, the term of this patent is extended or adjusted under 35 U.S.C. 154(b) by 897 days.

(21) Appl. No.: 12/755,722

(22) Filed: Apr. 7, 2010

(65) Prior Publication Data

US 2010/0253951 A1 Oct. 7, 2010

(30) Foreign Application Priority Data

Apr. 7, 2009 (JP) ................................ 2009-093127

(51) Int. Cl.

| | |
|---|---|
| ***H04N 1/60*** | (2006.01) |
| ***G06K 15/00*** | (2006.01) |
| ***H04N 1/40*** | (2006.01) |
| ***G03F 3/08*** | (2006.01) |
| ***G06K 9/00*** | (2006.01) |
| ***G06K 9/46*** | (2006.01) |
| ***G06K 9/32*** | (2006.01) |

(52) U.S. Cl.
USPC ............ 358/1.9; 358/2.1; 358/3.01; 358/518; 382/162; 382/237; 382/299

(58) Field of Classification Search
None
See application file for complete search history.

(56) References Cited

U.S. PATENT DOCUMENTS

| | | | | |
|---|---|---|---|---|
| 5,706,096 | A * | 1/1998 | Koike | 382/239 |
| 2006/0028663 | A1 * | 2/2006 | Maeda | 358/1.9 |
| 2008/0211926 | A1 * | 9/2008 | Kajiyama | 348/231.3 |
| 2008/0273807 | A1 * | 11/2008 | Dauw et al. | 382/237 |
| 2009/0067005 | A1 * | 3/2009 | Chelvayohan et al. | 358/2.1 |

FOREIGN PATENT DOCUMENTS

| | | | |
|---|---|---|---|
| JP | 07-087315 | A | 3/1995 |
| JP | 07-231385 | A | 8/1995 |
| JP | 2003-219150 | A | 7/2003 |

* cited by examiner

*Primary Examiner* — Thomas Lett
(74) *Attorney, Agent, or Firm* — Panitch Schwarze Belisario & Nadel LLP

(57) ABSTRACT

A manuscript reading apparatus capable of reading manuscript through a proper scan resolution without performing troublesome operation by user is supplied. In the image reading apparatus, a setting section 102 sets a scan resolution; an image reading section 103 reads manuscript through the set scan resolution; a storing section 104 stores the read image data; and an image processing section 106 determines a recommended resolution with respect to the scan resolution according to a continuous number of the same pixel in the image data.

22 Claims, 9 Drawing Sheets

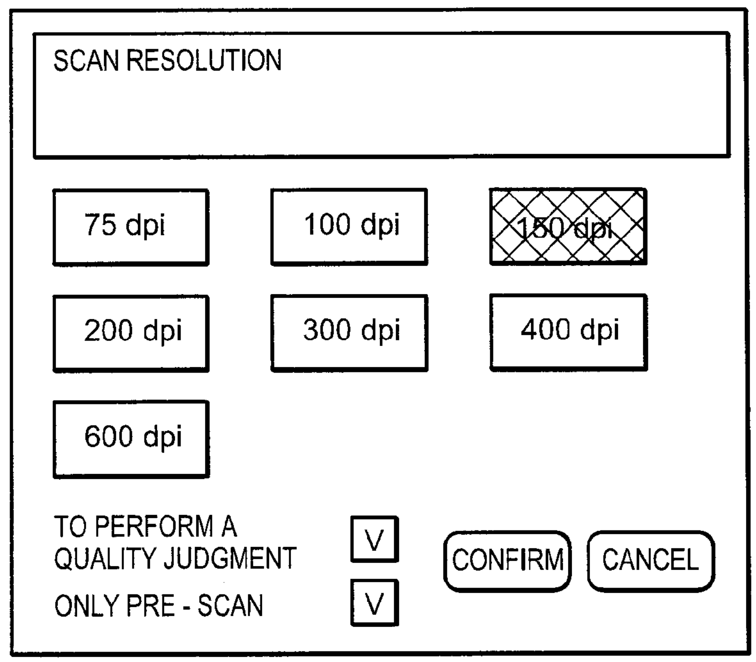

SCAN RESOLUTION

AS A RESULT OF JUDGMENT, RESOLUTION 150 DPI IS THE BEST IN THE PRESENT SELECTIONS.

*FIG. 4B*

SCAN RESOLUTION

AS A RESULT OF JUDGMENT, RESOLUTION IS TO EXCESS. 75 DPI IS RECOMMENDED.

*FIG. 4C*

SCAN RESOLUTION

AS A RESULT OF JUDGMENT, RESOLUTION IS IN LACK. 300 DPI IS RECOMMENDED.

*FIG. 4D*

SCAN RESOLUTION

AS A RESULT OF JUDGMENT, IT IS MANUSCRIPT CONTENT IN WHICH, IN SPITE OF THE LARGEST RESOLUTION, IMAGE QUALITY CANNOT BE GUARANTEED.

IMAGE READING APPARATUS AND IMAGE FORMING APPARATUS THAT DETERMINES SCANNING RESOLUTION BASED ON CONTINUOUS, SAME-KIND PIXELS

FIELD OF THE INVENTION

The invention relates to an image reading apparatus and an image forming apparatus that read (scan) manuscript, and obtain image data, in detail, relates to an image reading apparatus and an image forming apparatus capable of obtaining image data through an optimum scan resolution.

BACKGROUND OF THE INVENTION

Until now, in a scanner (image reading apparatus), or in a compound machine that installs a scanner, in the case to read manuscript, firstly, user sets a desirable scan resolution through an operation panel.

At this time, though it depends on a read manuscript image, if the resolution is too low, crush occurs in images of characters and segments that are obtained; on the contrary, if the resolution is higher than it is needed, scan time becomes long and capacity of read image data also becomes large (at this time, large capacity memory becomes necessary, and process time is also increased.). Therefore, it is inevitable for user to perform operation that spends time and labor so as to determine a proper resolution corresponding to manuscript after repeated trial and error, and is worst in convenience.

In view of such inconvenience, for example, in patent document 1, such technology is disclosed that once scans manuscript, determine a proper resolution through the image data, and scans again through the proper resolution. However, in the technology of the patent document 1, because it prescans through a highest resolution of the apparatus, the problem is still left that affects the scan time and the data capacity that are mentioned above.

Patent document 1: Japan patent publication of No. 2003-219150

SUMMARY OF THE INVENTION

It is, therefore, an object of the invention to provide an image reading apparatus and an image forming apparatus capable of performing a quick reading of manuscript through a proper scan resolution without performing troublesome operation by user, those are superior inconvenience, so as to solve the above problem.

That is, a first aspect of the invention is to provide an image reading apparatus, comprising: a setting section that sets a scan resolution; an image reading section that reads manuscript through the set scan resolution; a storing section that stores the read image data; and an image processing section that determines a recommended resolution with respect to the scan resolution according to a continuous number of the same pixel in the image data.

A second aspect of the invention is to provide an image forming apparatus that comprises an image reading apparatus and a printer for printing image data obtained by the image reading apparatus, wherein the image reading apparatus comprises: a setting section that sets a scan resolution; an image reading section that reads manuscript through the set scan resolution; a storing section that stores the read image data; and an image processing section that determines a recommended resolution with respect to the scan resolution according to a continuous number of the same pixel in the image data.

The Effect of the Present Invention

According to the present invention, because manuscript is read through a scan resolution that is set by user, and a recommended resolution is determined according to respective continuous pixel numbers with respect to the same pixel (white pixel and black pixel) of the obtained image data, it is possible to obtain image data with a proper quality efficiently without spending time and labor for setting the scan resolution by user as in the past.

The above and other objects and features of the present invention will become apparent from the following detailed description and the appended claims with reference to the accompanying drawings.

BRIEF DESCRIPTION OF THE DRAWINGS

FIG. 3 is a diagram showing a displaying example of a scan resolution setting scene;

FIG. 4A is a diagram showing a first displaying example of a scan resolution judgment result;

FIG. 4B is a diagram showing a second displaying example of a scan resolution judgment result;

FIG. 4C is a diagram showing a third displaying example of a scan resolution judgment result;

FIG. 4D is a diagram showing a fourth displaying example of a scan resolution judgment result;

DETAILED DESCRIPTION OF THE PREFERRED EMBODIMENTS

Embodiments of the invention will be described in detail hereinbelow with reference to the drawings.

Next, it is to explain embodiment form of the present invention on the basis of FIG. 1~FIG. 12.

Figure 2:
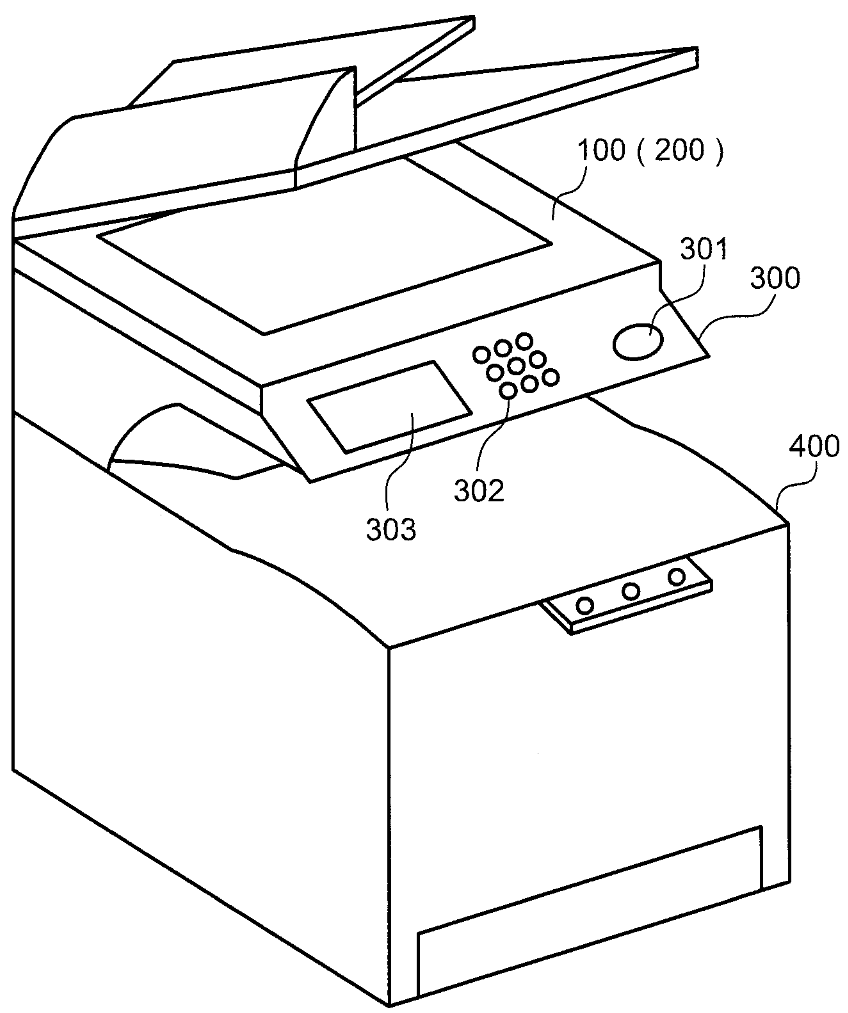
FIG. 2 is a diagram showing an outline of a compound machine to that the present invention is applied.

FIG. 2 is a diagram showing an outline of a compound machine as an image forming apparatus to that the present invention is applied, and comprises an image reading apparatus (scanner) 100 (200) of the present invention mentioned later, a printer 400, an operation panel 300 and the like.

The printer 400, for example, in which a printer of an electrophotographic method is used, inputs image data that is obtained by the scanner 100 (200), and forms an image by forming a toner image corresponding to the obtained image data and by making it fix into paper.

The operation panel 300 is composed of a scan start button 301, a scan mode setting use button 302, a displaying section 303 through liquid crystal and the like, and the like, and performs a setting, a displaying and the like of read instruction of manuscript and different kinds of parameter (for example, scan resolution, color mode and the like) through button operation of user.

Embodiment 1

Figure 1:
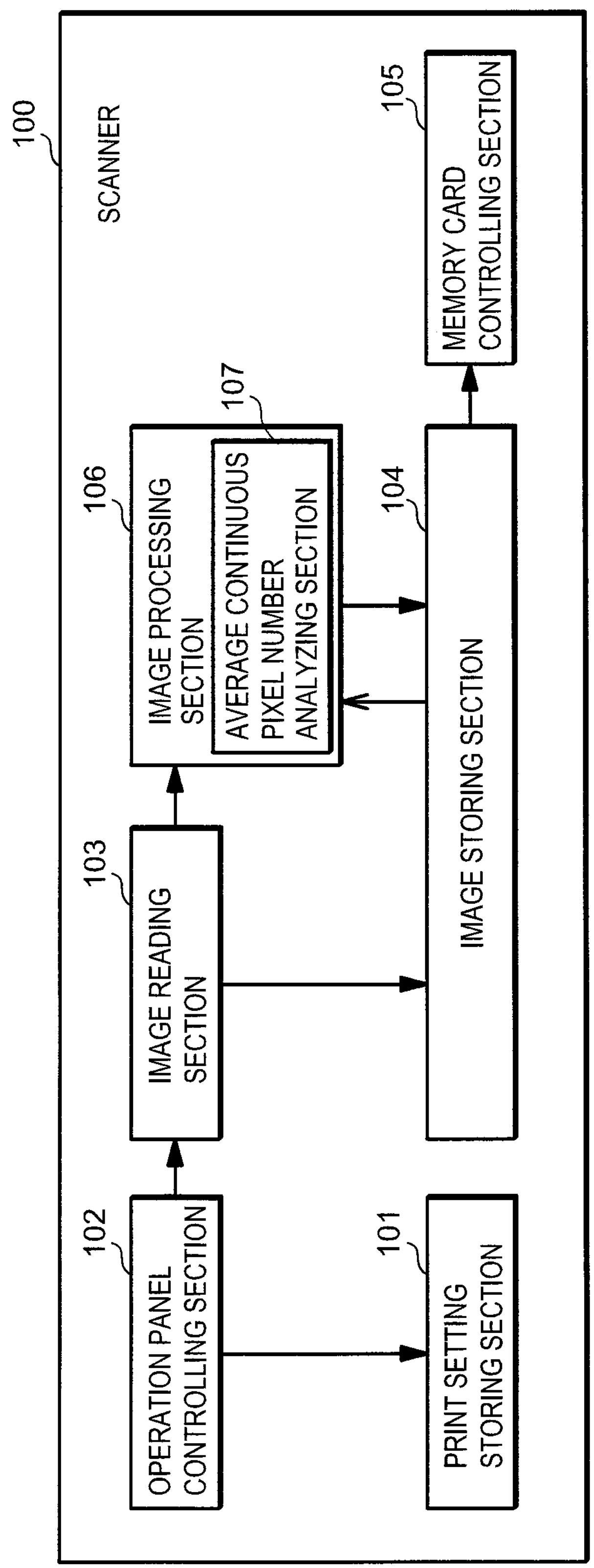
FIG. 1 is a block diagram showing a structure of a scanner of embodiment 1.

FIG. 1 is a block diagram showing a structure of a scanner 100 of embodiment 1.

The scanner 100 in embodiment 1 comprises a print setting storing section 101, an operation panel controlling section 102, an image reading section 103, an image storing section 104, a memory card controlling section 105, an image processing section 106 and the like.

The print setting storing section 101 is memory region for storing different kinds of setting information that is set on the operation panel 300.

The operation panel controlling section 102 is a function section for controlling an execution of different kinds of functions corresponding to button operation of the operation panel 300 through user, and a scene display in the displaying section 303. Operation order information is sent to the image reading section 103 on the basis of button operation of user.

The image reading section 103 is a function section that controls read operation (scan) of manuscript in the scanner 100 and that obtains image data. The obtained image data is sent to the image storing section 104. Moreover, in the present embodiment, monochrome binary image data (white is displayed as "0", black is displayed as "1") is obtained through the scan.

The image storing section 104 is a data storing region for storing the obtained image data, and is, for example, formed from a large capacity hard disc.

The memory card controlling section 105 is a function section that controls operation of a memory card reader that is installed in the compound machine. As a memory card, for example, USB memory can be used.

The image processing section 106 is a function section that loads image data stored in the image storing section 104 and that performs image analysis, and comprises an average continuous pixel number analyzing section 107.

The average continuous pixel number analyzing section 107 is a function section that is materialized through executing a control program for image process by a CPU (not shown) installed in scanner 100; analyzes the monochrome binary image data loaded from the image storing section 104; detects respective pixel numbers with respect to white pixel and black pixel; and calculates their average value and its standard deviation.

Figure 5:
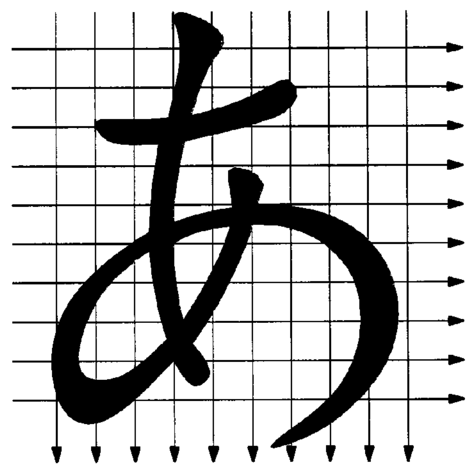
FIG. 5 is a diagram showing an analysis direction of a continuous pixel number.

The above image analysis, as shown by FIG. 5, is performed through referring to fixed image in every one pixel and one line in a horizontal direction (main scanning direction) and a perpendicular direction (sub scanning direction). It is to show a detecting example of a continuous pixel number of black pixel "1" and white pixel "0" through image analysis in the horizontal direction in FIG. 6.

Moreover, in the case to analyze the image, it is also possible to omit analysis of the perpendicular direction with respect to the image, because of the balance of process time and analysis result.

Here, it is to explain a displaying control of the scan resolution setting scene through the operation panel controlling section 102 mentioned above on the basis of FIG. 3. FIG. 3 is a diagram showing a displaying example of a scan resolution setting scene.

As shown by FIG. 3, in the present embodiment, on the displaying section 303, seven kinds of scan resolutions of 75 dpi, 100 dpi, 150 dpi, 200 dpi, 300 dpi, 400 dpi and 600 dpi can be set. In the time to start the scan, user selects a desirable one of these scan resolutions. In FIG. 3, a case is shown in which scan resolution 150 dpi is selected. Moreover, in the case that user does not select a scan resolution, a default of scan resolutions is set.

Further, check boxes are displayed for designating effectiveness/ineffectiveness of a function of "to perform a quality judgment" and a function of "only pre-scan". User can set effectiveness/ineffectiveness of these functions through operation of a touch panel. For example, after the effectiveness is set about the function mentioned above, a check mark is displayed in a corresponding check box.

"to perform a quality judgment" is a function that notifies of whether or not the scan resolution selected by user is a proper resolution in view of image quality and data capacity.

"only pre-scan" is displayed only in the case that the function of "to perform a quality judgment" is effective, and is a function that only performs a judgment of image quality without storing image data into the memory card. In the case that the function of "only pre-scan" is ineffective, the read image data is stored directly into the memory card. This is called as scan to memory card function.

Figure 8:
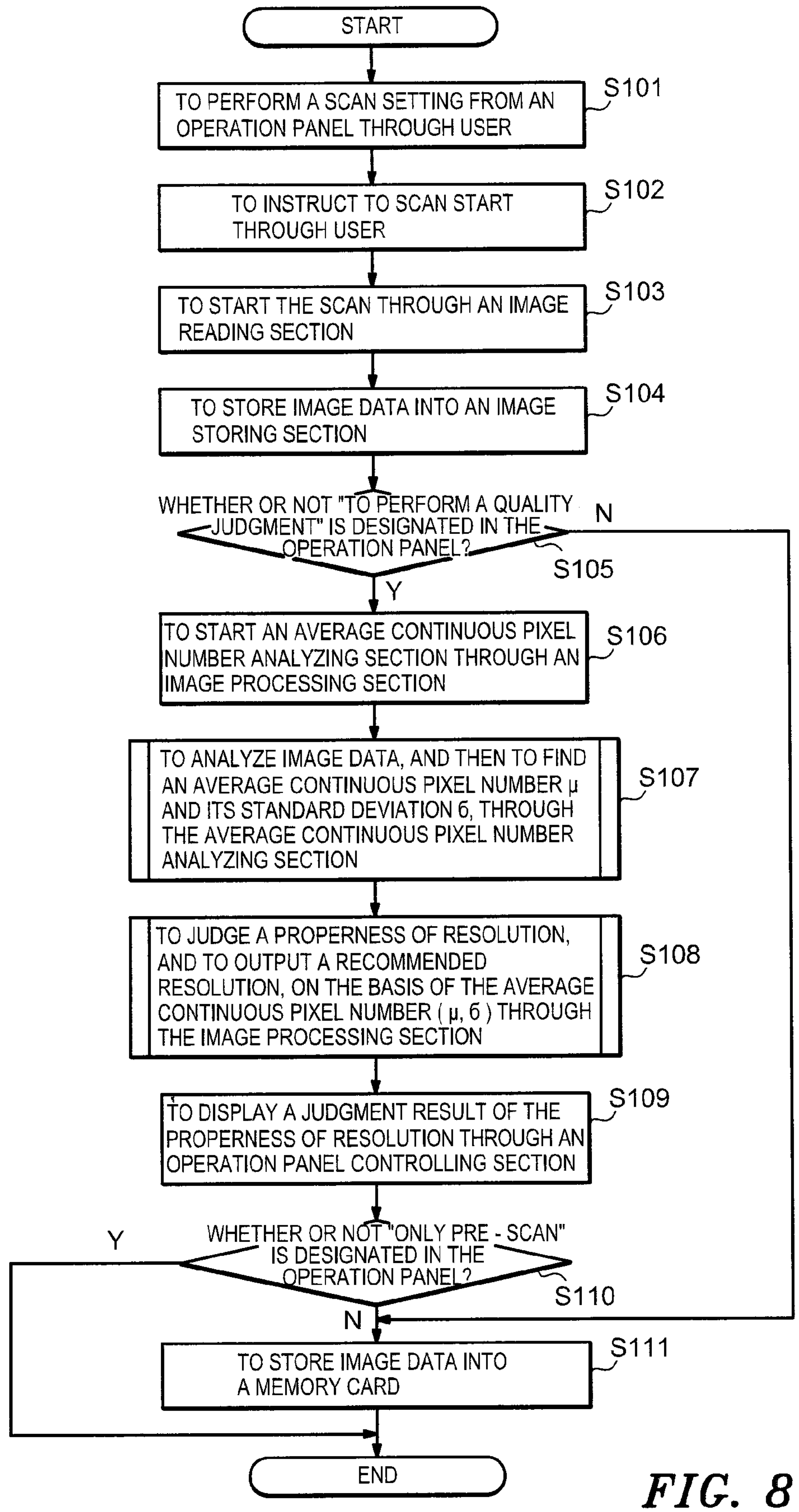
FIG. 8 is a flow chart for explaining operation of a scanner of embodiment 1.
Figure 9:
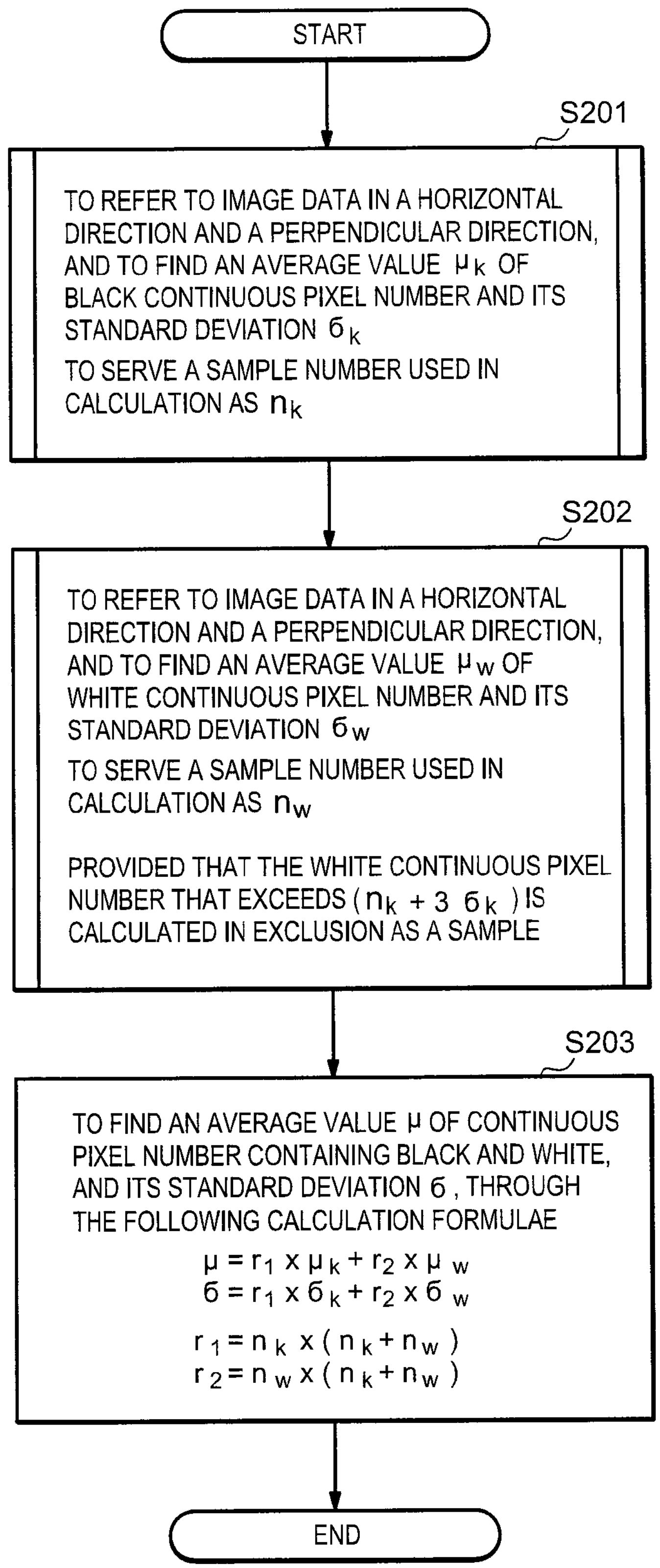
FIG. 9 is a flow chart for explaining operation of an average continuous pixel number analyzing section of embodiment 1.
Figure 10:
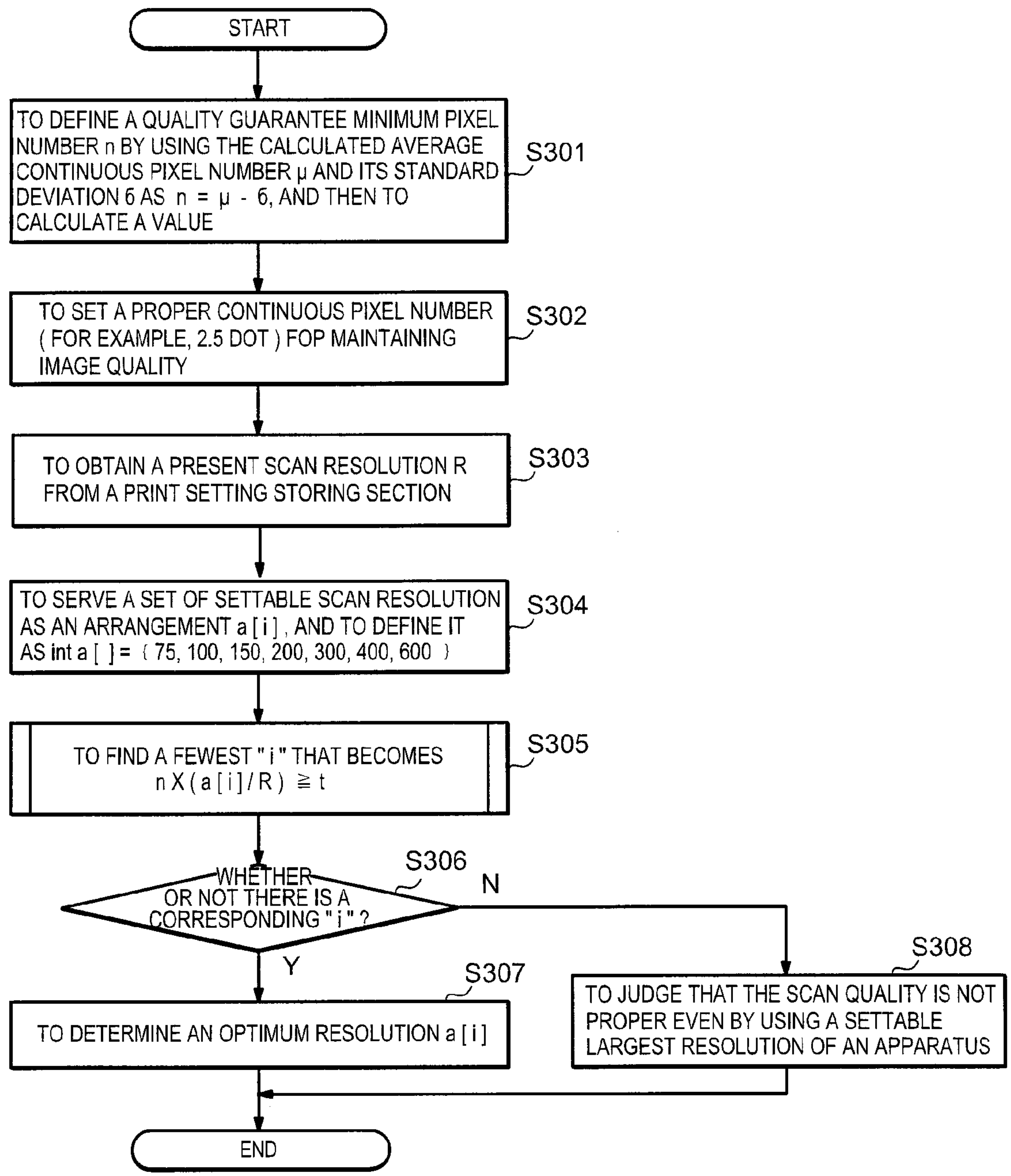
FIG. 10 is a flow chart for explaining operation of an image processing section of embodiment 1.

Next, it is to explain operation of the scanner 100 with the structure mentioned above on the basis of FIG. 8~FIG. 10. FIG. 8 is a flow chart for explaining operation of the scanner 100; FIG. 9 is a flow chart for explaining operation of an average continuous pixel number analyzing section; and FIG. 10 is a flow chart for explaining operation of an image processing section.

With respect to S101 of FIG. 8, firstly, user performs a mode setting in the case of scan through button operation of the operation panel 300. In the present embodiment, as shown by FIG. 3, 150 dpi is selected as a scan resolution, furthermore, with respect to scanning manuscript image, both of function of "to perform a quality judgment" and function of "only pre-scan" are set as "effectiveness". The setting information is stored in the print setting storing section 101.

Next, with respect to S102, user instructs to start the scan through button operation of the operation panel 300.

Next, with respect to S103, the image reading section 103, after received an instruction of the scan start from the operation panel controlling section 102, starts scan operation (monochrome binary mode) of manuscript that is set in the scanner 100, and obtains image data.

Next, with respect to S104, the image reading section 103 stores image data (monochrome binary data) that is obtained through the scan in the image storing section 104.

Next, with respect to S105, the image reading section 103 judges whether or not function of "to perform a quality judgment" of the operation panel 300 is effective according to setting information stored in the print setting storing section 101, and when it judges that the function is ineffective, the step is shifted to S111. When it judges that the function is effective, the step goes ahead to S106, and with respect to the S106, the image processing section 106 starts the average continuous pixel number analyzing section 107. Concretely, the CPU starts a control program for image process, and executes the following process.

With respect to S107, the average continuous pixel number analyzing section 107 analyzes the image data stored in the image storing section 104, detects white and black continuous pixel number; and calculates these average continuous pixel number $\mu$ and its standard deviation $\sigma$. Moreover, the calculation process of the average continuous pixel number $\mu$ and its standard deviation $\sigma$ is mentioned later.

Next, with respect to S108, the image processing section 106 judges properness of the scan resolution on the basis of the average continuous pixel number $\mu$ and its standard deviation $\sigma$ that are calculated through the average continuous pixel number analyzing section 107, determines a recommended resolution, and outputs the information. Moreover, properness judgment of the scan resolution and calculation of the recommended resolution is mentioned later.

Next, with respect to S109, the operation panel controlling section 102 displays a judgment result (image quality information) about the properness of the outputted scan resolution on the displaying section 303 of the operation panel 300 (referring to FIG. 4).

Next, with respect to S110, through the setting information stored in the print setting storing section 101, it is judged that whether or not the function of "only pre-scan" of the displaying section 303 is effective; if effective, the present process is completed; and if ineffective, the step goes ahead to S111, with respect to the S111, the memory card controlling section 105 stores the image data stored in the image storing section 104 into a memory card, and deletes the image data stored in the image storing section 104 at the same time.

Next, on the basis of FIG. 5 and FIG. 9, it is to explain calculation process of the average continuous pixel number $\mu$ and its standard deviation $\sigma$ those are mentioned in S107 of FIG. 8. FIG. 5 is a diagram showing an analysis direction of a continuous pixel number.

Firstly, with respect to S201, as shown by FIG. 5, the whole image data is referred to about two dimension directions of horizontal direction and perpendicular direction, and an average value $\mu_k$ of continuous number of black pixel (continuous pixel number) and its standard deviation (average of unevenness) $\sigma_k$ are calculated. Sample number of this time is served as $n_k$. Moreover, because the referred image data is binary image data, the image data is analyzed in bit unit, and if value of bit is "1", it is judged black pixel; if value of bit is "0", it is judged white pixel.

Here, it is to explain a concrete example about a calculation of the average value $\mu_k$ and its standard deviation $\sigma_k$.

As shown by FIG. 5, the black continuous pixel numbers that are detected through data analysis are 5 dot, 4 dot and 3 dot (sample number is 3).

Therefore, the average value $\mu_k$ becomes $$\mu_k=(5.0+4.0+3.0)/3=4(\text{dot}).$$

Further, the standard deviation is an average value of difference with the average value, and can be calculated by using a definition formula of well-known unbiased variance.

That is, the standard deviation $\sigma_k$ is calculated through finding a square average $\sigma_k^2$ by dividing (sample number −1) into (a sum of the square of the unevenness) and its square root, and becomes $$\sigma_k^2=((5.0-4.0)^2+(4.0-4.0)^2+(3.0-4.0)^2/(3-1)=1.0$$

$$\sigma_k=\sqrt{(\sigma_k^2)}=1.0(\text{dot}).$$

That is, in the example of FIG. 5, it is judged that the average value of black continuous pixel number is 4 dot, and ±1 dot of unevenness exists.

Here, about continuous pixel number of white pixel and black pixel, in the case to obtain large number of sample values (average value $\mu$ and standard deviation $\sigma$), the standard deviation of the continuous pixel number around characters and segments that affects image quality can be approximated as normal distribution curve in which the average value $\mu$ is served as a center.

Further, in the normal distribution curve, it is known theoretically that the probability in which sample value belongs to region (1 sigma interval) of ($\mu\pm\sigma$) is 68.2%. Incidentally, in region (2 sigma interval) of ($\mu\pm2\sigma$), the probability is 95.4%; and in region (3 sigma interval) of ($\mu\pm3\sigma$), the probability is 99.7%.

Therefore, it can be judged that the probability in which the sample value becomes to be over ($\mu-\sigma$) is (68.2/2)+50≈84%, because the probability of $\mu$ is over 50%, and in the present embodiment, on the basis of the judgment standard, properness judgment of the scan resolution and calculation of the recommended resolution mentioned later are performed.

Next, with respect to S202, as shown by FIG. 5, the whole image data is referred to in a horizontal direction and a perpendicular direction, and an average value $\mu_w$ of white pixel (continuous pixel number) and its standard deviation $\sigma_w$ are calculated. Further, sample number of this time is served as $n_w$.

However, in the present embodiment, in the case to calculate the average value $\mu_w$ and its standard deviation $\sigma_w$, the white continuous pixel number that exceeds a fixed number ($\mu_k+3\sigma_k$) is excluded from samples.

This is because of the following reason.

That is, in the normal distribution curve, the probability in which sample value belongs to the region (3 sigma interval) of ($\mu\pm3\sigma$) becomes to be 99.7% in theory, which is the same as mentioned above.

Considering this point, with respect to S202, after it is judged that a sample in which white continuous pixel number exceeds ($\mu+3\sigma$) is mere white continuous pixel number in a margin region (for example, background of image), the sample value is excluded from the calculation. Thus, in the calculation of the average value of the continuous pixel number and its standard deviation, it is possible to avoid such an inconvenience as an unsuitable sample is taken in the calculation, and it is possible to obtain a calculation result with high degree of precision.

Figure 6:
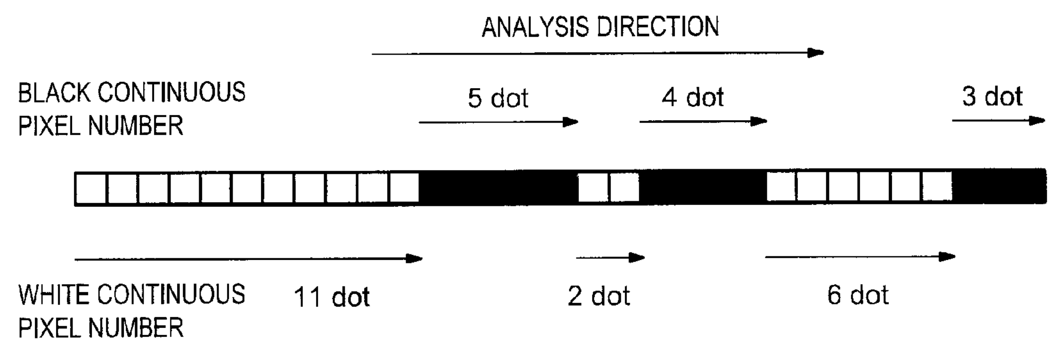
FIG. 6 is a diagram showing a detecting example of a continuous pixel number.
Figure 7:
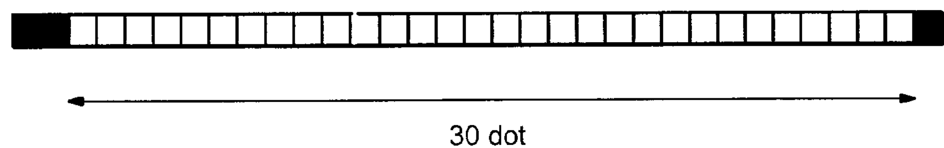
FIG. 7 is a diagram showing an example of a pixel line that is excluded from a calculation of a continuous pixel number.

If this concrete example is explained on the basis of FIG. 6 and FIG. 7, as calculated in S201, because the average value $\mu_k$ of the black continuous pixel number is 4.0 dot and its standard deviation $\sigma_k$ is 1.0 dot, it turns out to ($\mu_k+3\sigma_k$)=7.0 dot.

Therefore, in the case to calculate the average value $\mu_w$ of the white continuous pixel number and its standard deviation $\sigma_w$ the sample in which the white continuous pixel number exceeds 7.0 dot is excluded.

That is, taking away 11 dot and 30 dot from the white continuous pixel number 11 dot, 2 dot, 6 dot and 30 dot, two sampling values of 2 dot and 6 dot are used, and the average value $\mu_w$ of the white continuous pixel number and its standard deviation $\sigma_w$ are calculated similarly to the case of the black pixel.

$$\mu_w=(2.0+6.0)/2=4.0$$

$$\sigma_w^2=((2.0-4.0)^2+(6.0-4.0)^2)/(2-1)=4.0$$

$$\sigma_w=\sqrt{(\sigma_w^2)}=2.0(\text{dot}).$$

Next, with respect to S203, the average value $\mu$ of the continuous pixel number including black pixel and white pixel, and its standard deviation $\sigma$ are calculated according to the following formulae (1) and (2).

$$\mu=r_1\times\mu_k\times r_2\times\mu_w \quad (1)$$

$$\sigma=r_1\times\sigma_k+r_2\times\sigma_w \quad (2)$$

Moreover, when $r_1$ represents weight with respect to the black pixel, $r_2$ represents weight with respect to the white pixel, sample number of the black pixel is served as $n_k$, and sample number of the white pixel is served as $n_w$, weight $r_1$ and $r_2$ are shown as the following formulae (3) and (4).

$$r_1=n_k\times(n_k+n_w) \quad (3)$$

$$r_2=n_w\times(n_k+n_w) \quad (4)$$

Here, according to the concrete examples of S201 and S202 mentioned above, an average value $\mu_k$ of black continuous pixel number is 4.0 dot, its standard deviation $\sigma_k$ is 1.0 dot, the sample number $n_k$ is 3; and an average value $\sigma_w$ of white continuous pixel number is 4.0 dot, its standard deviation $\sigma_w$ is 2.0 dot, the sample number $n_w$ is 2, so according to the formulae (3) and (4), it turns out to $$r_1=n_k\times(n_k+n_w)=0.6$$

$$r_2=n_w\times(n_k+n_w)=0.4.$$

Therefore, the average value $\mu$ of the continuous pixel number including black pixel and white pixel and its standard deviation $\sigma$ can be calculated as follows according to formulae (1) and (2).

$$\mu=r_1\times\mu_k+r_2\times\mu_w=4.0(\text{dot})$$

$$\sigma=r_1\times\sigma_k+r_2\times\sigma_w=1.4(\text{dot}).$$

Next, on the basis of FIG. 10, it is to explain about calculation process of a properness judgment of the scan resolution and the recommended resolution that are mentioned in S108 of FIG. 8.

Firstly, with respect to S301, a quality guarantee minimum pixel number n is calculated by using the average continuous pixel number $\mu$ calculated in S107 of FIG. 8 and its standard deviation $\sigma$.

The quality guarantee pixel number is a necessary and minimum continuous pixel number for maintaining image quality of characters and lines, and in the present embodiment, the quality guarantee minimum pixel number is served as $n=\mu-\sigma$. Moreover, the definition of the quality guarantee minimum pixel number n is based on the judgment standard mentioned in S201 of FIG. 9, and according to the concrete example of S203 of FIG. 9, because the average continuous pixel number $\mu$ is 4.0 dot and its standard deviation $\sigma$ is 1.4 dot, the quality guarantee minimum pixel number n becomes 2.6 dot.

Next, with respect to S302, a proper continuous pixel number t that becomes a threshold is set for judging a properness of image quality.

For guaranteeing image quality of characters and lines, in the case that the continuous pixel number is 1 dot, the image quality is obviously inferior, and at least 2~3 dot is needed. In experience, for example, in the image in which the image of the continuous pixel number 1 dot is connected to the image of the continuous pixel number 2 dot, image quality becomes low. Thus, in the present embodiment, the proper continuous pixel number t is served as 2.5 dot.

Moreover, it is desirable to determine the most suitable value about the proper continuous pixel number on the basis of different kinds of experiments.

Next, with respect to S303, through the print setting storing section 101, a present scan resolution R (for example, 150 dpi) is obtained that is selected by user.

Next, with respect to S304, a set of settable scan resolutions is served as an arrangement a[i], and in an ascending order, it is defined as int a [ ]={75, 100, 150, 200, 300, 400, 600} (i=0~6).

Next, with respect to S305, the smallest resolution a[i] that satisfies the condition of the following formula (5) is calculated.

$$n\times(a[i]/R)\geq t \quad (5)$$

CONCRETE EXAMPLE 1

If the quality guarantee minimum pixel number n is served as 2.6 dot, the proper continuous pixel number t is served as 2.5 dot, the scan resolution R is served as 150 dpi and the arrangement a[i] is served as {75, 100, 150, 200, 300, 400, 600}, according to the formula (5), it is calculated that a[i]=150 dpi and i=2, and because of the present calculation result, the scan resolution R=150 dpi that is selected by user is judged as an optimum resolution.

CONCRETE EXAMPLE 2

Further, as a result of scanning other manuscript by using the same scan resolution R=150 dpi, if the quality guarantee minimum pixel number n is 5.2 dot, according to the formula (5), a[i]=75 dpi and i=0 are calculated.

The present calculation result means that, even when the scan resolution R is reduced to 75 dpi that is half of 150 dpi, because 2.6 dot that is value of half of the quality guarantee minimum pixel number n=5.2 dot exceeds the proper continuous pixel number t=2.5 dot, the judgment standard (continuous pixel number is 84%) mentioned above can guarantee a larger value than the proper continuous pixel number t.

Consequently, in the scan of the present manuscript, it is judged that the scan resolution can be set to 75 dpi.

CONCRETE EXAMPLE 3

Further, as a result that scans other manuscript by using the same scan resolution R=150 dpi, if the quality guarantee minimum pixel number n is 1.3 dot, according to the formula (5), a[i]=300 dpi and i=4 are calculated.

The present calculation result means that, if the scan resolution is not raised to 300 dpi that is double of 150 dpi, because 2.6 dot that is value of double the quality guarantee minimum pixel number n=1.3 dot does not exceed the proper continuous pixel number t=2.5 dot, the continuous pixel number 84% cannot guarantee a larger value than the proper continuous number t.

Consequently, in the scan of the present manuscript, it is judged that 300 dpi should be selected as a scan resolution.

Moreover, in order to enlarge a guarantee region so that the quality guarantee minimum pixel number n becomes larger than the proper continuous pixel number t, it is also possible to calculate the quality guarantee minimum pixel number n as ($\mu-2\sigma$) or ($\mu-3\ \sigma$). Incidentally, in the case of $n=(\mu-2\sigma)$, it becomes 97%; and in the case of $n=(\mu-3\sigma)$, it becomes 99%.

Next, with respect to S306, as a result of a calculation through the formula (5) mentioned above, it is judged whether or not there is a corresponding i (that is, scan resolution), when there is a corresponding i, the step is shifted to S307, and with respect to the S307, an optimum resolution a[i] based on i is outputted as a recommended resolution.

The judgment results of the concrete examples 1~3, as stated above, are displayed on the displaying section 303 of the operation panel 300 in S109 of FIG. 8.

In the case of the <concrete example 1> of S305, for example, as shown by FIG. 4A, “scan resolution, as a result of judgment, resolution 150 dpi is the best in the present selections.” is displayed.

In the case of the <concrete example 2>, for example, as shown by FIG. 4B, "scan resolution, as a result of judgment, resolution is to excess. 75 dpi is recommended." is displayed.

In the case of the <concrete example 3>, for example, as shown by FIG. 4C, "scan resolution, as a result of judgment, resolution is in lack. 300 dpi is recommended." is displayed.

On the other hand, when it is judged that there is no corresponding "i", the step is shifted to S308, with respect to the S308, it is judged that proper image quality cannot be obtained even when it is scanned through the largest settable resolution (in the present embodiment, 600 dpi) of the apparatus.

In other words, it can be judged that image of manuscript set by user is, even though it is scanned through the largest resolution 600 dpi of the apparatus, fine painting so that image quality of over a constant cannot be obtained.

At this time, for example, as shown by FIG. 4A, "As a result of scan resolution judgment, it is manuscript content in which, in spite of the largest resolution, image quality cannot be guaranteed." is displayed.

As mentioned above, according to the embodiment 1, because manuscript is read through the scan resolution that is set by user, respective continuous pixel numbers with respect to the white pixel and the black pixel of the obtained image data are analyzed, and a recommended resolution is determined, so it is superior in convenience for user to obtain image data with a proper quality efficiently without spending time and labor for setting the scan resolution.

Especially, because an analysis judgment (image quality information) of the scan resolution is displayed on the displaying section, according to the analysis judgment, user can clearly judge whether it is needed to scan again or the scan result can be used.

Embodiment 2

Figure 11:
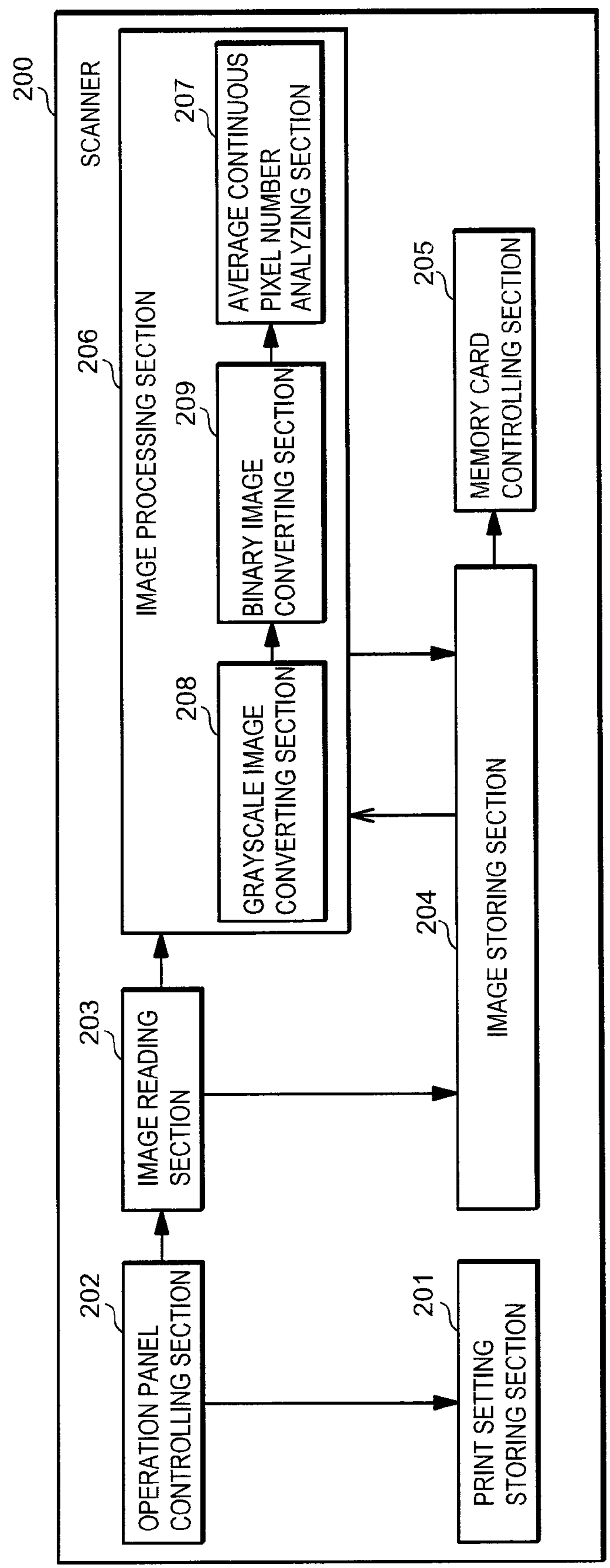
FIG. 11 is a block diagram showing a structure of a scanner of embodiment 2.

FIG. 11 is a block diagram showing a structure of a scanner 200 of embodiment 2.

The scanner 200 comprises a print setting storing section 201, an operation panel controlling section 202, an image reading section 203, an image storing section 204, a memory card controlling section 205, an image processing section 206 and the like.

In the structure mentioned above, except the image processing section 206, the print setting storing section 201, the operation panel controlling section 202, the image reading section 203, the image storing section 204 and the memory card controlling section 205 are the same as the print setting storing section 101, the operation panel controlling section 102, the image reading section 103, image storing section 104 and the memory card controlling section 105, of the embodiment 1 (FIG. 1), so explanations of them are omitted.

However, the image reading section 203 is different from the image reading section 103 of the embodiment 1, because it obtains any one of monochrome binary image data, grayscale image data or color image data.

Here, the color image data is composed of three components of R, G and B that are in one pixel, and is represented by multi-leveled data in which respective components are one byte (256 tone). Further, the grayscale image data is formed from one component of black that is in one pixel, and one component is represented by multi-valued data of one byte (256 tone).

The image processing section 206 is a function section that loads image data stored in the image storing section 204 and that performs image analysis, and includes an average continuous pixel number analyzing section 207, a grayscale image converting section 208, a binary image converting section 209 and the like.

Respective function sections of these average continuous pixel number analyzing section 207, grayscale image converting section 208 and binary image converting section 209 are materialized through executing a control program for image process by a CPU (not shown) installed in scanner 200, the grapy scale image converting section 208 is a function section that converts color image data into grayscale image data; and the binary image converting section 209 is a function section that converts grayscale image data into monochrome binary image data.

Further, the average continuous pixel number analyzing section 207 is a function section that analyzes image data (monochrome binary, color and grayscale) obtained through the image storing section 204; that detects respective continuous pixel numbers with respect to white pixel and black pixel; and that calculates its average value and standard deviation. Moreover, with respect to respective image data of color and grayscale, image analysis is performed after converted into binary data.

Figure 12:
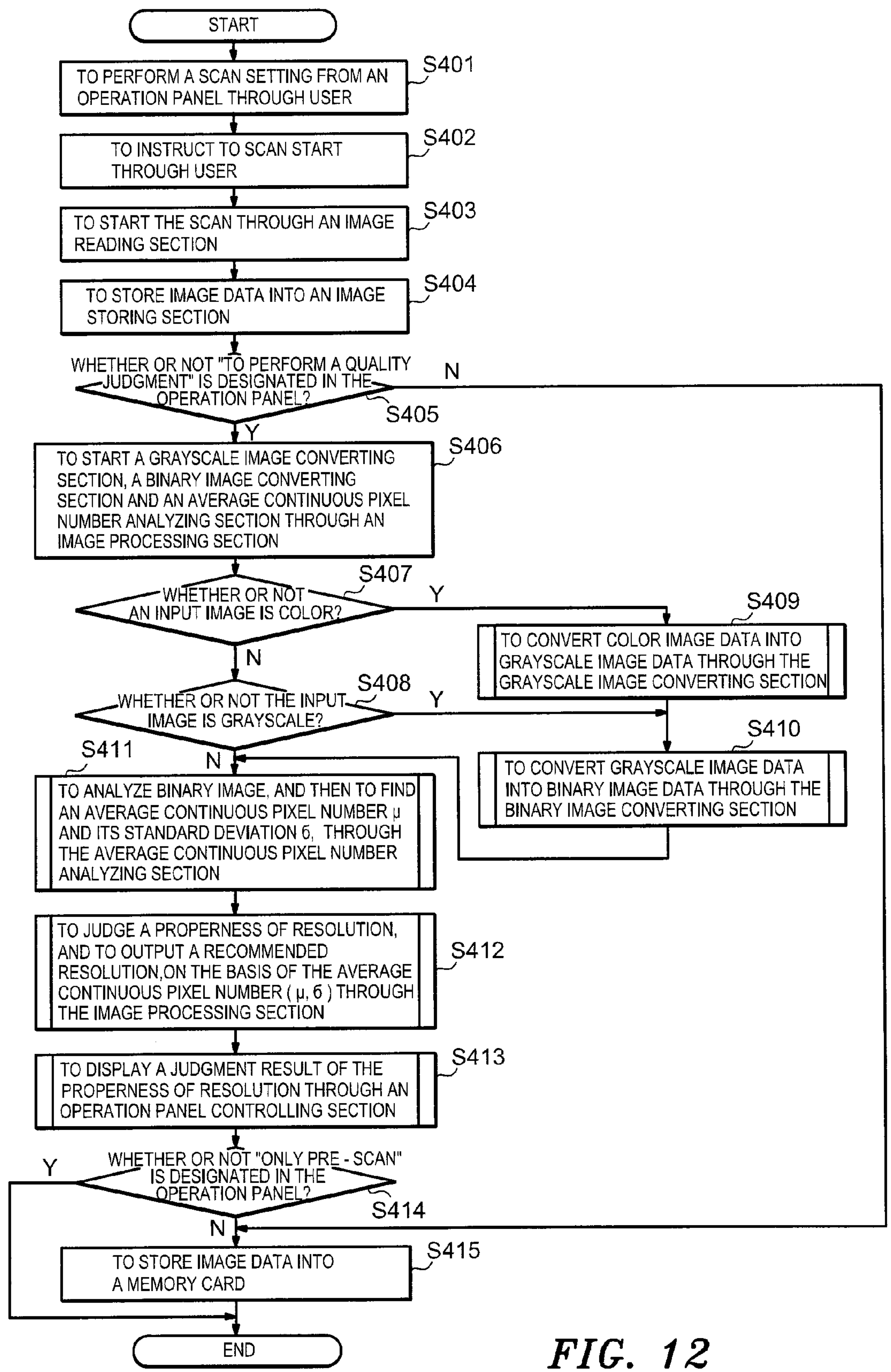
FIG. 12 is a flow chart for explaining operation of a scanner in embodiment 2.

Next, it is to explain operation of the scanner 200 of the structure mentioned above on the basis of FIG. 12. FIG. 12 is a flow chart for explaining operation of a scanner 200.

Moreover, in the flow chart of FIG. 12, because processes of S401~S405 are the same as the processes of S101~S105 of the embodiment 1 (FIG. 8), further, processes of S411~S415 of latter part are the same as the processes of S107~S111 of the embodiment 1 (FIG. 8), so explanations of repetition processes are omitted, and only new processes S406~S410 are explained.

With respect to S405, in the case that function of "to perform a quality judgment" is judged to be effective, the step goes ahead to S406, and with respect to S406, the image processing section 206 starts the grayscale image converting section 208, the binary image converting section 209 and the average continuous pixel number analyzing section 207. That is, the CPU starts the control program for image process, and executes the following process.

With respect to S407, the image processing section 206 obtains setting information through the print setting storing section 201, and judges whether or not input image is color. In the case that the input image is not color, the step goes ahead to S408, and with respect to S408, it is judged whether or not the input image is grayscale. Then, in the case that the input image is grayscale, the step goes ahead to S410, and in the case that the input image is not grayscale, the step goes ahead to S411.

Further, in S407, when it is judged that the input image is color, the step goes ahead to S409, and with respect to the S409, the grayscale image converting section 208 converts the image data (color image data composed of RGB value) stored in the image storing section 204 into grayscale image data.

Moreover, for converting the RGB value into grayscale, after the RGB value is converted into YCbCr color space, Y component that is the luminance component is used. A convert formula from the RGB value is represented as the following formula (6).

$$Y=0.299\times R+0.587\times G+0.114\times B \quad (6)$$

Next, with respect to S410, the binary image converting section 209 further converts the grayscale image data into binary image data. In the present embodiment, the threshold for binarization is set to 70% density, a pixel whose density is over 70% is regarded as a black pixel "1" and a pixel whose density is under 70% is regarded as a white pixel "0".

Further, the threshold 70% can be adjusted on the basis of a measurement result.

As mentioned above, according to embodiment 2, because a grayscale image converting section 208 that converts color image data into grayscale image data and a binary image converting section 209 that converts grayscale image data into monochrome binary image data are included, in spite of a color mode that is set in the time to scan, it is possible to calculate a recommended resolution through image analysis, and the same effect as the embodiment 1 ca be obtained.

THE UTILIZATION POSSIBILITY IN INDUSTRY

As stated above, in the present embodiment, as an image forming apparatus, it is to explain a compound machine that includes an image reading apparatus of the present invention. However, it is also possible to apply to the image forming apparatus such as copy machine, FAX and the like without doubt.

Further, the present invention is also possible to apply to Scan To USB Memory, Scan to Email, Scan To Server, PC Scan and the like those are function of scan relation of the compound machine.

The present invention is not limited to the foregoing embodiments but many modifications and variations are possible within the spirit and scope of the appended claims of the invention.

What is claimed is:

1. An image reading apparatus, comprising:

a setting section that sets a scan resolution;

an image reading section that reads a manuscript through the set scan resolution and obtains read image data;

a storing section that stores the read image data; and an image processing section that detects a continuous pixel number for each quantity of continuous, same-kind pixels in the read image data and determines an optimum scan resolution based on a present scan resolution selected by a user and a result of an analysis of the read image data and the detected continuous pixel number.

2. The image reading apparatus according to claim 1, wherein the image processing section calculates a quality guarantee minimum pixel number according to an average value of respective continuous pixel numbers and its standard deviation with respect to white pixel and black pixel; and determines the recommended resolution through comparing the quality guarantee minimum pixel number with a fixed threshold.

3. The image reading apparatus according to claim 2, wherein representing the average value of the continuous pixel numbers as $\mu$ and its standard deviation as $\sigma$, the quality guarantee minimum pixel number n is defined as $n=\mu-\sigma$.

4. The image reading apparatus according to claim 2, wherein representing the average value of the continuous pixel numbers as $\mu$ and its standard deviation as $\sigma$, the quality guarantee minimum pixel number n is defined as $n=\mu-2\sigma$.

5. The image reading apparatus according to claim 2, wherein representing the average value of the continuous pixel numbers as $\mu$ and its standard deviation as $\sigma$, the quality guarantee minimum pixel number n is defined as $n=\mu-3\sigma$.

6. The image reading apparatus according to claim 2, wherein the continuous white pixel whose number is over a constant number is excluded from the calculation of the quality guarantee minimum pixel number.

7. The image reading apparatus according to claim 1, wherein analysis of the continuous pixel numbers is performed with respect to a main scanning direction and a sub scanning direction.

8. The image reading apparatus according to claim 1, wherein analysis of the continuous pixel numbers is performed with respect to a sub scanning direction.

9. The image reading apparatus according to claim 1, further comprising:

a displaying section that displays image quality information with respect to a properness of the scan resolution on the basis of an analysis result of the image processing section.

10. The image reading apparatus according to claim 9, wherein the image quality information contains the recommended resolution.

11. The image reading apparatus according to claim 9, wherein the image quality information contains information with respect to a magnitude relation between the recommended resolution and the scan resolution.

12. The image reading apparatus according to claim 11, wherein in a case that the recommended resolution is over the largest resolution settable in the apparatus, the display section displays the case.

13. The image reading apparatus according to claim 1, further comprising: an image converting section that converts color image data into binary image data.

14. The image reading apparatus according to claim 1, further comprising: an image converting section that converts grayscale image data into binary image data.

15. The image reading apparatus according to claim 1, wherein the image processing section judges a properness of the scan resolution and outputs a judgment result.

16. The image reading apparatus according to claim 15, wherein the properness of the scan resolution is judged without storing the image data.

17. The image reading apparatus according to claim 1, wherein the detected continuous pixel number n excludes white continuous pixel numbers that exceed $3\sigma$, where $\sigma$ is the standard deviation of the average value of the continuous pixel number.

18. The image reading apparatus according to claim 1, wherein the optimal scan resolution satisfies the relationship $n\times(a[i]/R)\geq t$, where n is a quality guarantee minimum pixel number, a[i] is a set of settable scan resolutions, R is a present scan resolution and t is a proper continuous pixel number.

19. An image forming apparatus comprising an image reading apparatus and a printer for printing image data obtained by the image reading apparatus, wherein the image reading apparatus comprises:

a setting section that sets a scan resolution;

an image reading section that reads a manuscript through the set scan resolution and obtains read image data;

a storing section that stores the read image data; and an image processing section that detects a continuous pixel number for each quantity of continuous, same-kind pixels in the read image data respectively and determines an optimum scan resolution based on a present scan resolution selected by a user and a result of an analysis of the read image data and the detected continuous pixel number.

20. The image forming apparatus according to claim 19, further comprising: a memory card for memorizing the image data stored in the storing section.

21. The image forming apparatus according to claim 20, wherein the image data is removed from the storing section after the image data is memorized in the memory card.

22. The image forming apparatus according to claim 20, wherein the memory card is an USB memory card.

* * * * *